United States Patent [19]
Tonouchi

[11] Patent Number: 6,138,272
[45] Date of Patent: Oct. 24, 2000

[54] GDMO TRANSLATOR, METHOD OF GDMO TRANSLATION, AND RECORDING MEDIUM CONTAINING PROGRAM FOR GDMO TRANSLATOR

[75] Inventor: Toshio Tonouchi, Tokyo, Japan

[73] Assignee: NEC Corporation, Tokyo, Japan

[21] Appl. No.: 09/151,518

[22] Filed: Sep. 11, 1998

[30] Foreign Application Priority Data

Sep. 25, 1997 [JP] Japan .................................. 9-259536

[51] Int. Cl.[7] .............................. G06F 9/45; G06F 15/16
[52] U.S. Cl. ............................................... 717/5; 709/200
[58] Field of Search .................................. 395/705, 708; 717/5

[56] References Cited

U.S. PATENT DOCUMENTS

| | | | |
|---|---|---|---|
| 5,291,583 | 3/1994 | Bapat ........................................... | 717/5 |
| 5,519,868 | 5/1996 | Allen et al. .................................... | 717/5 |
| 5,608,720 | 3/1997 | Biegel et al. ............................. | 370/249 |
| 5,704,041 | 12/1997 | Allen et al. .............................. | 709/316 |
| 5,764,955 | 6/1998 | Doolan ...................................... | 709/223 |
| 5,790,812 | 8/1998 | Frohmuller et al. ...................... | 709/200 |
| 5,850,511 | 12/1998 | Stoecker et al. ............................ | 717/4 |
| 5,870,749 | 2/1999 | Adusumilli .................................. | 717/5 |
| 5,892,950 | 4/1999 | Rigori et al. ................................. | 717/5 |
| 5,983,233 | 11/1999 | Potonniee ................................ | 709/315 |

OTHER PUBLICATIONS

Japanese Opposition, dated Apr. 4, 2000, with English language translation of Japanese Examiner's comments.
Chew et al.; "An Object–Oriented GDMO Tool for Network Management". IEEE/IEE Electronic Library[online]. International Conference on Information Engineering '93, vol. 1, pp. 344–348, Sep. 1993.
Rahkila et al., "XMP++: An Object–Oriented Solution for Hiding The Complexity of Network Management Protocols". ACM Digital Library[Online], Proceedings of the thirteenth annual ACM symposium on Principles of Distributed Computing, Aug. 1994.
Tonouchi et al., "An Implementation of OSI Management Q3 Agent Platform for Subscriber Networks". IEEE/IEE Electronic Library[online], ICC '97 Montreal, Towards the Knowledge Millennium, vol. 2, pp. 889–893, Jun. 1997.
Fraley, R.; "A View of the GDMO Interface Definition Language". IEEE/IEE Electronic Library[online], Proceedings of the Sixteenth Annual International Computer Software and Applications Conference, pp. 88–89, Sep. 1993.
Sun Microsystems Inc.; "Solstice Telecommunications Management: White Paper", Accessed on Feb. 22, 2000. Retrieved from the Internet: http://www.sun.com/software/white–papers/wp–tmnproducts/index.html, Apr. 1994.
Genilloud, G.; "An analysis of the OSI systems management architecture an ODP perspective". IEEE/IEE Electronic Library[online], Proceedings of the second International Workshop on Systems Management, pp. 72–81, Jun. 1996.

(List continued on next page.)

*Primary Examiner*—Tariq R. Hafiz
*Assistant Examiner*—Kelvin E. Booker
*Attorney, Agent, or Firm*—McGuireWoods LLP

[57] ABSTRACT

A GDMO translator is provided, which is capable of generating output files with various syntaxes from an input file with the same syntax, and which is capable of describing different outputs containing, for example, an indefinite number of nesting structures.

A parser 140 reads an input file and produces an abstract syntax tree by conducting an analysis according to a prescribed syntax. The abstract syntax tree is then stored in the abstract syntax tree data base 120 through the data base access means 130. The translation means 80 reads the output template 100 through the syntax reading means 60 and the lexical analysis means 70. The translation means 80 generates the output file, while on one hand, accessing the syntax tree data base which stores the syntax tree representing the input file content, following the output template file 100, and, on the other hand, realizing the nesting structure with indefinite depth using a file stack for recording the position of the recursive control, or conducting a conditional branch processing.

17 Claims, 14 Drawing Sheets

OTHER PUBLICATIONS

Chadayammuri, P.; "A Platform for building integrated telecommunications network management applications". Hewlett–Packard Journal, v47, n5, p. 6–17, Oct. 1996.

Hewlett–Packard; "H HP Openview Telecom GDMO Modeling Toolkit". Accessed on May 30, 2000. Retrieved from the Internet: http://www.hp.com/ovc/pdf/Gdmo30.pdf, Apr. 1997.

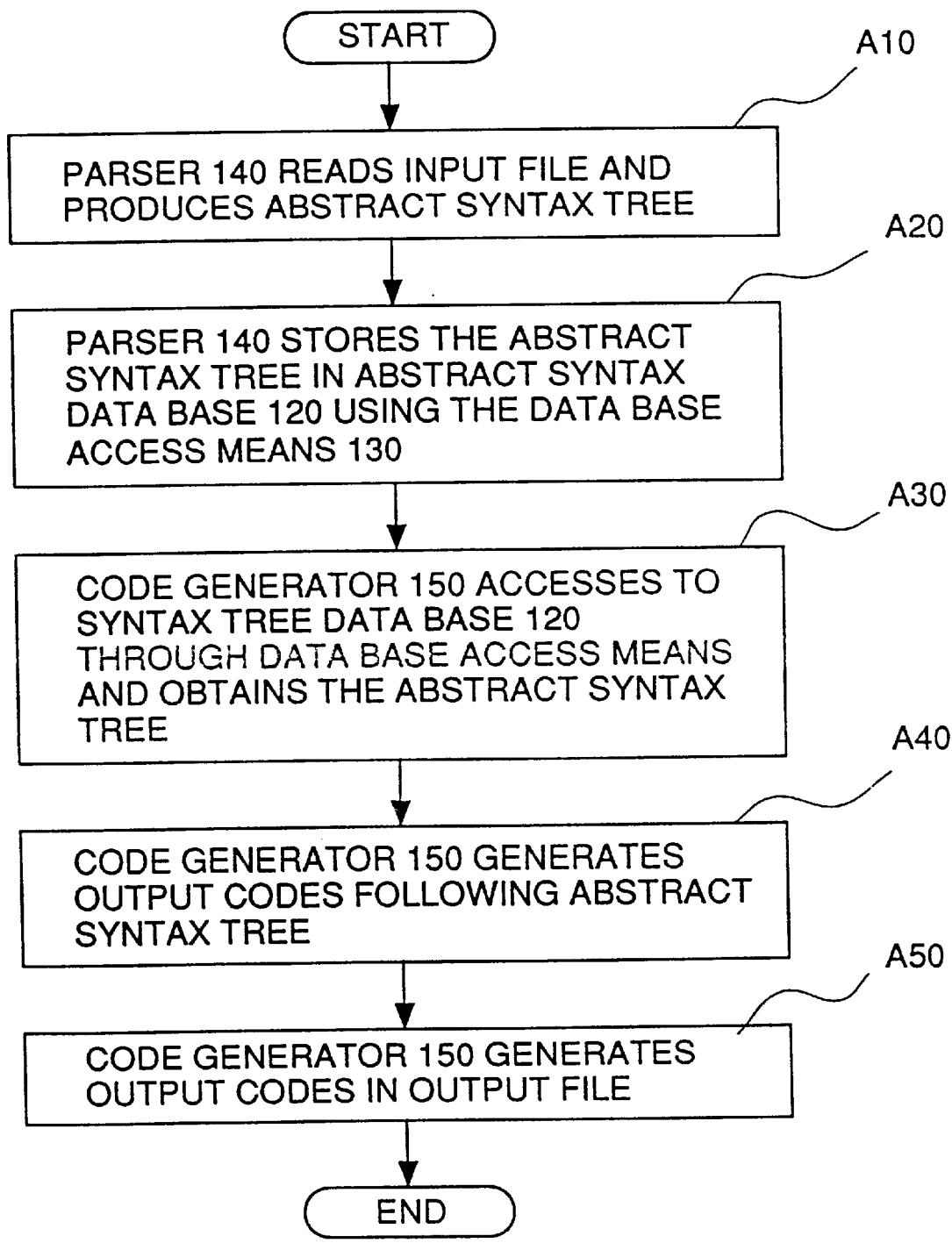

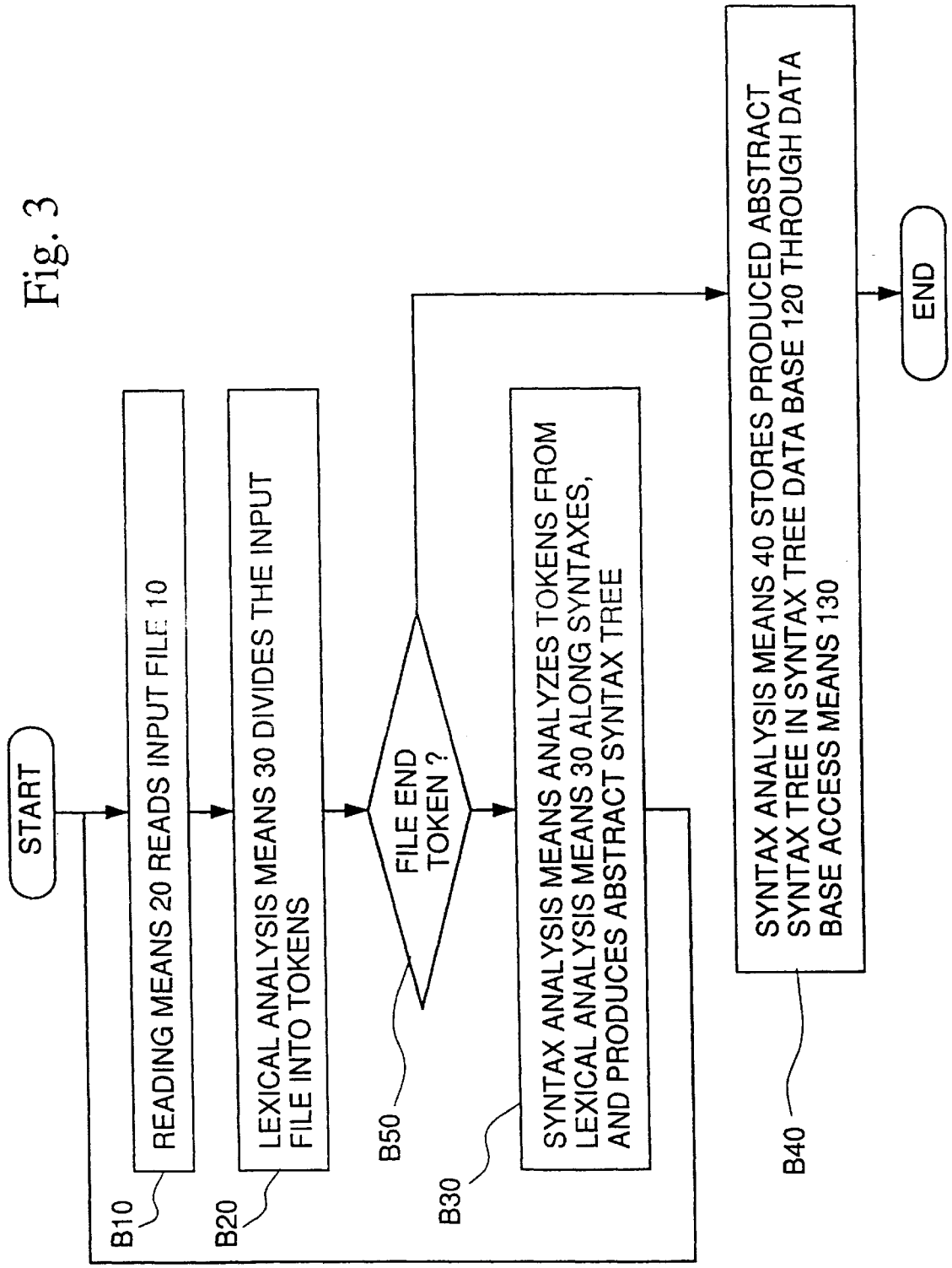

FIG. 5

```
<INCLUDE @($CONFIGFILEDIR, "/", heading_acgen.gen")>

<FOR "CLASSES">
<FOR \0 "ACTIONS">
Attr* GCM<STACK 1>_<STACK 0>_action(
        CNTInstance* moi,
<IF (\0, "TYPE")>
<MATCH "Normal">
        CNTInstance* ict
</MATCH>
<MATCH "Shared">
        CNTSharedInstance* ict
</MATCH>
</IF>
);
</FOR>
</FOR>
```

FIG. 6

```
/* *****************************
    This is a sample program file.
    All rights are reserved.
*******************************/
Attr* GCMstateChange_log_action(
        CNTInstance* moi,
        CNTSharedInstance* ict
);

Attr* GCMstateChange_eventFordingDiscriminator_action(
        CNTInstance* moi,
        CNTInstance* ict
);
```

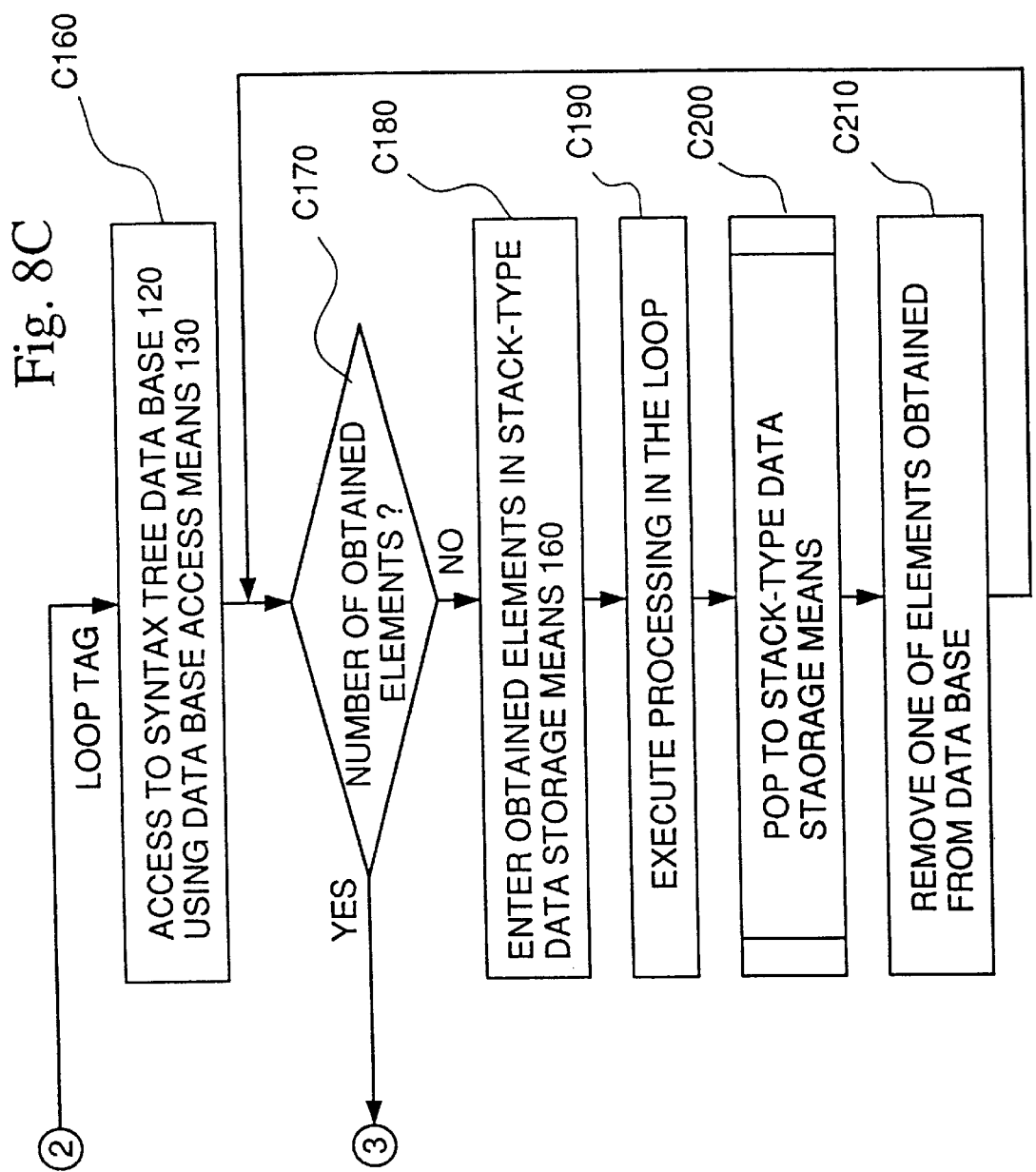

FIG. 11

```
void クラス名 ::set_ClassDesc () {
    Class* ClassDescP = & ClassDesc;
    ClassDescP -> set_Name("NAMES OF CLASSES");
    ClassDescP -> set_baseClasses (THE NUMBER OF BASE CLASSES
                        & NAMES OF BASE CLASSES::ClassDesc, ........);
    ClassDescP -> set_memberClasses (THE NUMBER OF BASE CLASSES
                        & NAMES OF MEMBER CLASSES::ClassDesc, ........);
}
```

FIG. 12

```
void Member ::set_ClassDesc () {
    Class* ClassDescP = & ClassDesc;
    ClassDescP -> set_Name("Member");
    ClassDescP -> set_baseClasses(0);
    ClassDescP -> set_memberClasses (0);
} void Base ::set_ClassDesc () {
    Class* ClassDescP = & ClassDesc;
    ClassDescP -> set_Name("Base");
    ClassDescP -> set_baseClasses(0);
    ClassDescP -> set_memberClasses (0);
} void Derived ::set_ClassDesc () {
    Class* ClassDescP = & ClassDesc;
    ClassDescP -> set_Name("Derived");
    ClassDescP -> set_baseClasses(1, & Base :: ClassDesc);
    ClassDescP -> set_memberClasses (1, &Member :: ClassDesc);
}
```

GDMO TRANSLATOR, METHOD OF GDMO TRANSLATION, AND RECORDING MEDIUM CONTAINING PROGRAM FOR GDMO TRANSLATOR

BACKGROUND OF THE INVENTION

1. Field of the Invention

The present invention is related to a GDMO (Guideline for Definition of Managed Objects) translator, and particularly related to a GDMO translator, a method of GDMO translation, and a recording medium containing a program for GTMO translation which are capable of generating a variety of application programs for a plurality of network management systems. These technologies will be comprehensively called as the GDMO translator.

This application is based on Patent Application No. Hei 9-25953 filed in Japan, the content of which is incorporated herein by reference.

2. Background Art

Conventionally, this type of GDMO translator is, as shown in Japanese Patent Application, First Publication No. Hei 3-179950, used for generating application programs to construct a network management system. The system disclosed in Japanese Patent Application, First Publication No. Hei 3-179950 starts up a managed object compiler by inputting a template containing managed object contents. The managed object compiler generates static data for a management information table.

In this case, if the network management system is an OSI (Open Systems Interconnection) management agent, the template is the GDMO template and the management object compiler corresponds to the GDMO translator. The GDMO translator generates data or programs relating to the network management system.

There is a type of conventional GDMO translator, as disclosed in Japanese Patent Application, First Publication No. Hei 8-202544, which facilitates changing an output file syntax by use of a generating source template. FIG. 10 shows a block diagram of a conventional translator disclosed by Japanese Patent Application, First Publication No. Hei 8-202544. A user describes the user source file 1010 and starts up the compiler 1020 while inputting the user source file 1010. The compiler 1020 generates a user source program object code 1070 on one hand, and, on the other hand, the front portion 1200 conducts a lexical analysis, a syntax analysis, and a semantic analysis to extract a definition in terms of classes in the user source program 1010, and the definition is output to an analysis information file 1030. A program generation processing portion 1050 receives the analysis information file 1030 as an input and generates a generating source program 1060. A method of generating the generating source program 1060 is executed by the steps of reading a generating source template 1040 and outputting the content of the generating source template 1040 as it is to the generating source template 1040. The generating source program 1060 is generated by substituting the portion concerned in the generating source template 1040 for a segment of information indicated by the analysis information file 1030.

FIG. 11 illustrates an example of a generating source templates 1040 disclosed in Japanese Patent Application, First Publication No. Hei 8-202544. The generating source program is generated by replacing a portion described by Kanji character codes with information indicated by the analysis information file 1030.

The first problem in conventional systems is that they require to develop a number of GDMO translators, because, although input information is the same, the system must cover wide application objects. Therefore, labor-hours to develop many GDMO translators increases inevitably.

The reason for the above problem is in that there are a number of platforms for developing a network management system, which links with output programs of the GDMO translators. The network management system is constructed based on a GDMO template, a syntax of which is regulated by the OSI. The GDMO translator plays a role to produce a program code for the network management system from the GDMO template by automating the above procedure. The disclosure of the above Japanese Patent Application, First Publication No. Hei 3-179950 is an example of such GDMO translator. In the network management system, there are always two things comprising a network monitoring manager and a network monitoring object, both of which are developed based on the same template. However, a program generated for a platform for developing the network monitoring manager and a program generated for a platform for the network monitoring object are different. Therefore, it is necessary to provide at least two GDMO translators for constructing the network management system.

In addition, since there are many platforms for developing the network management system, it is necessary to develop various GDMO translators corresponding to respective platforms. Even if the platform is the same, since many opportunities are encountered to change an application program interface (API) whenever the version is upgraded, it is also necessary to develop and to modify the GDMO template whenever the version is altered.

The first problem may be avoided, as disclosed in Japanese Patent Application, First Publication No. Hei 8-202544, by adopting a method to reduce labor-hours to develop a new GDMO translator by making the output code predetermined using a generating source template. However, a second problem arises that, in the conventional systems, syntaxes of the output-able source file are restricted.

The reason for the above problem is as follows. Japanese Patent Application, First Publication No. Hei 8-202544 produces a table of results of a syntax semantics analysis step by classifying those by a standard of the semantic information. The program generation processing portion generates a generation source program by filling a prescribed portion of a generation source template with information referring to the table. However, since unnecessary information in the semantic analysis step is excluded, information embedded in the output file is limited.

Additionally, it is possible by the table to manage information which does not contain nesting, but it is not possible to manage an input file having a syntax containing nesting. Thus, the form of information which can be stored in the table is restricted. Furthermore, the syntax for generating the generation source program is restricted.

The third problem is in that generation templates disclosed in Japanese Patent Application, First Publication No. Hei 8-202544 are not able to generate output source programs having several syntax structures. Practically, impossible output source programs include an output source program containing not a fixed number of nests or an output source program having a completely different content from the input file content.

The reason of the third problem is because the generation source template has only two constituting elements. One of these elements is a template output portion for outputting the content of the generation source template as it is to the output source program, and another is a substitution portion which, after referring to the elements in the table of the analysis information table, outputs the substituted portion to the output source program after substitution. It is not possible for these two elements to generate an output source program having not a fixed number of nests or an output source program which does not have a completely different content from the content of the input file.

It is therefore the object of the present invention to reduce man-hours to develop a GDMO compiler and to facilitate the development of GDMO compilers for output files having different syntaxes.

Another object of the present invention is to facilitate maintenance of the GDMO compiler by facilitating change of the syntax of the output file.

The other object of the present invention is to generate an output file based on a complicated syntax as the output file of the GDMO translator which facilitates change of the syntax of the output file. Here, the complicated syntax means a syntax for generating output files containing a nest structure with an indefinite depth or generating completely different output files depending upon the input file content.

SUMMARY OF THE INVENTION

The first GDMO translator of the present invention describes a syntax of an output file into an output template file. Practically, the first GDMO translator comprises an output template file (the reference numeral of 100 in FIG. 1) containing a description of a syntax of an output file and a translation means (80 in FIG. 1) for translating the output template content.

The second GDMO translator of the present invention produces an abstract syntax tree by reading the output template before generating the output file. The translation means generates the output file by reading the abstract syntax tree. Practically, this GDMO translator comprises a syntax analysis means (200 in FIG. 7) for producing the abstract syntax tree by reading the output template file (100 in FIG. 7) and a syntax data base (210 in FIG. 7) for storing the abstract syntax tree.

The translation means produces the output file by retrieving the syntax tree data base conforming to the content of the output template file. Accordingly, it is possible to change the output file content by changing a content of the output template file, even if the input file is the same. The translation means comprises a stack-type data storage means and a file stack, so that the translation means is able to store the halfway state or to perform recursive reading during processing. Thereby, the translation means enables producing output files having complicated syntaxes such as the output file with a nest structure.

The syntax translation means of this embodiment stores the content of the output template file in the syntax data base in advance, so that the translation means is able to produce the output file at high speed, without reading the same portion of the output file for a plurality of times.

These embodiments can be used alone or in a combinations of two.

BRIEF DESCRIPTION OF DRAWINGS

FIG. 2 is a flow-chart showing an operation of the first embodiment of the present invention.

FIG. 3 is a flow-chart showing an operation of a parser in the first embodiment of the present invention.

FIG. 5 shows an example of output template files of the present invention.

FIG. 6 shows an example of output files of the present invention.

FIGS. 8A, 8B, and 8C is flow-charts showing an operation of the second embodiment of the present invention.

FIG. 11 shows an example of output templates of the background art.

FIG. 12 shows an example of output files of the background art.

DESCRIPTION OF PREFERRED EMBODIMENTS

Figure 1:
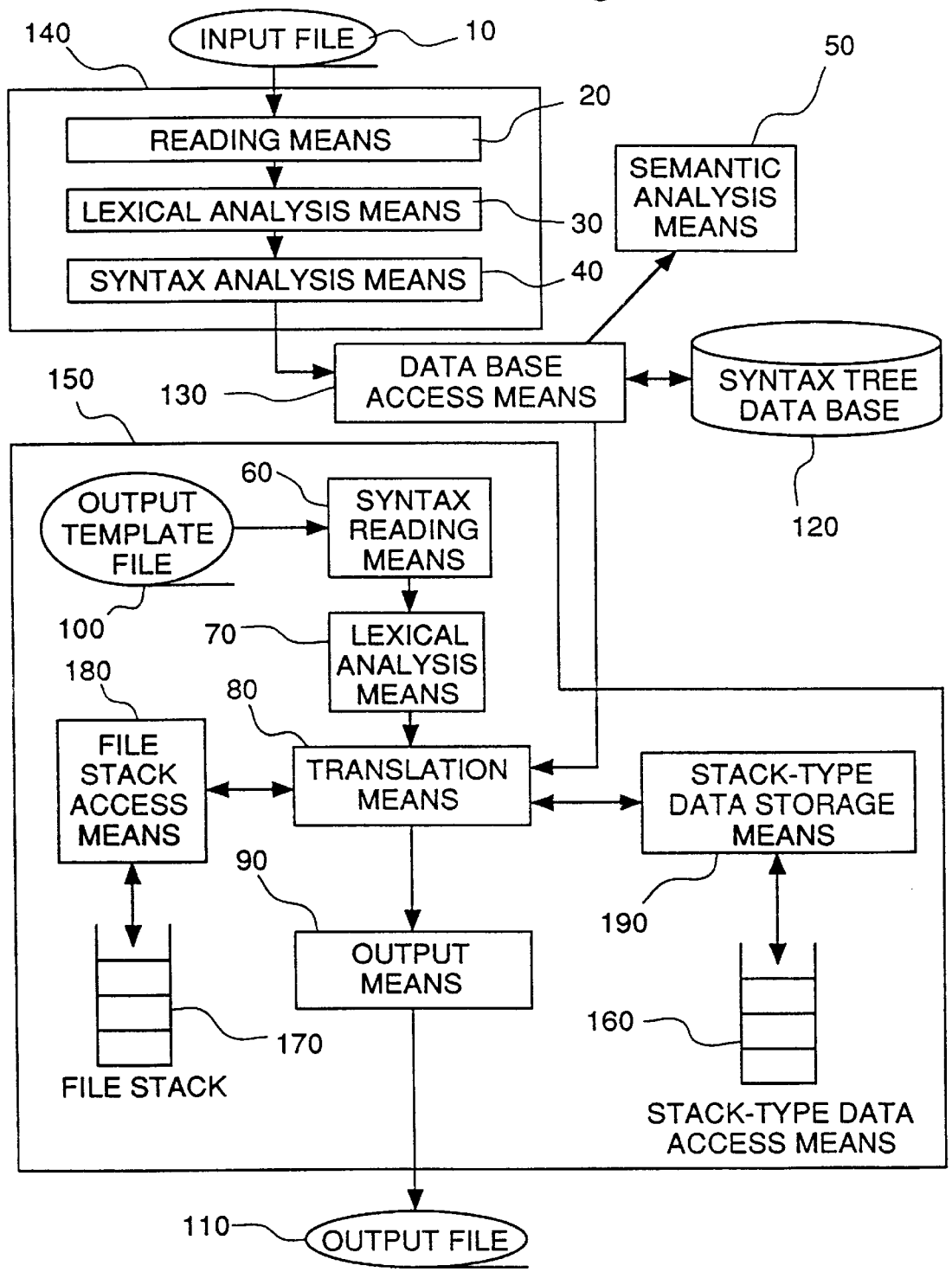
FIG. 1 is a block diagram showing the construction of the first embodiment of the present invention.

Preferred embodiments of the present invention will be described hereinafter referring to the attached drawings.
First Embodiment Referring to FIG. 1, the present embodiment comprises a reading means 20 for taking an input file 10 with a description of a GDMO template into a GDMO translator; a lexical analysis means 30 for dividing the file taken by the reading means 20 into tokens; a syntax analysis means 40 for producing an abstract syntax tree by analyzing syntaxes of the input file 10 depending upon the content of tokens transferred from the lexical analysis means 30; a semantic analysis means 50 for detecting semantic errors of the abstract syntax trees by reading the abstract syntax tree; a syntax tree data base 120 for storing the abstract syntax tree produced by the syntax analysis means 40; a data base access means 130 for accessing the syntax tree data base 120; an output template file 100 for determining a syntax of an output file 110; a syntax reading means 60 for reading the output template file 100; a lexical analysis means 70 for performing its lexical analysis and a translation means 80 for analyzing its syntax; a stack-type data storage means 160 used by the translation means 80 for storing data temporarily; a stack-type data access means 190 for accessing the storage means 160; an output means 90 for outputting an output file following the output template file 100; while the translation means 80 maintains access to the syntax tree data base; a file stack 170 for storing a descriptor recording a file name of the output template file 100 and a present reading position; and a file stack access means 160. The parser 140, composed of the reading means 20, the lexical analysis means 30, and the syntax analysis means 40, executes the syntax analysis of the input file 10, produces the abstract syntax tree, and stores it in the syntax data base 120. The syntax reading means 60, the lexical analysis means 70, the translation means 80, the output means 90, the stack-type data storage means 160, the stack-type data access means 190, the file stack 170, the file stack access means 180, and the output template file 100 constitute a code generator 150 which takes the syntax tree out of the abstract syntax tree data base 120 and produces the output file 110.

The content of the output template file comprises one type of tokens composed of ordinary letters and the other type of tokens representing a function called a tag. The ordinary letters in the output template are output to the output file as they are, and the tag directs a method of producing the output file 110.

Description of an operation of the first embodiment

An operation of the present embodiment is described hereinafter referring to FIGS. 2, 3, and 4.

FIG. 2 is a flow-chart illustrating a flow of processing of the present invention as a whole. First, the parser 140 reads the input file 10 and produces an abstract syntax tree according to the content of the file (Step A10). The parser 140 stores the thus produced abstract syntax tree in the abstract syntax tree data base 120 through the data base access means 130 (Step A20). The code generator 150 accesses to the syntax tree data base 120 through the data base access means 130 to obtain the abstract syntax tree (Step A30). The code generator 150 generates an output code following the abstract syntax tree (Step A40), and the generated code is output as the output file 110 through the output means 90 (Step A50).

FIG. 3 is a flow-chart showing a detailed processing flow by the parser 140. First, the reading means 20 reads the input file 10 into the parser 140 (Step B10). The lexical analysis means 30 divides the content of the input file into each token and transfers every token one by one to the syntax analysis means 40 (Step B20). The syntax analysis means 40 checks whether or not the token is the end token of the file (Step B50). If the token is not the end token of the file, the syntax analysis means 40 analyzes the tokens according to a syntax to produce a node of the abstract syntax tree and the node is made to be a part of the abstract syntax tree (Step B30). The above processing is repeated until the end token of the file.

If the last token appears, the syntax analysis means 40 stores the produced abstract syntax tree in the abstract syntax tree data base 120, through the data base access means 130. Thus, the processing is completed and the program goes to the processing of the code generator 150.

Figure 4A:
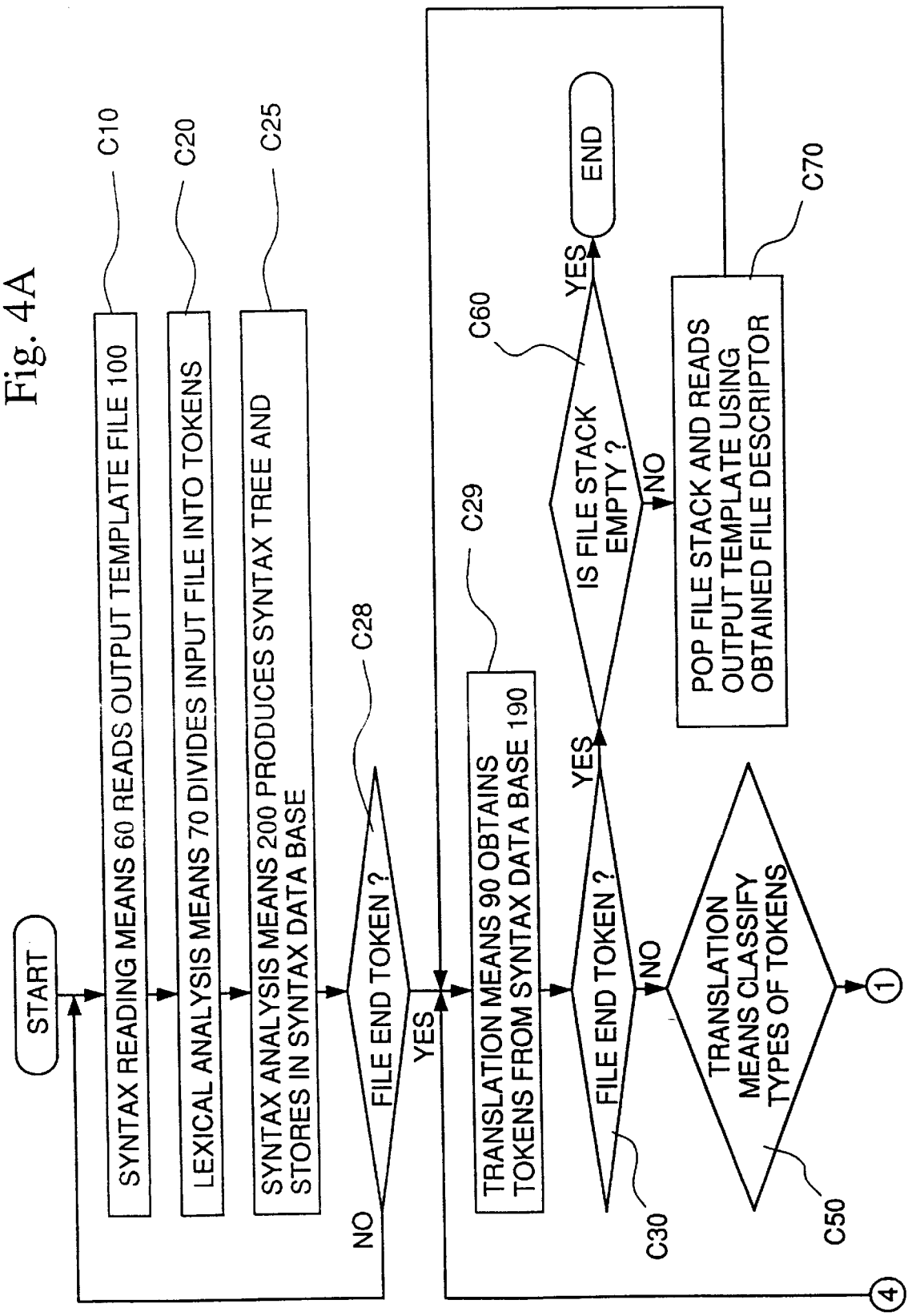
FIGS. 4A, 4B, and 4C are flow-charts showing an operation of a code generator in the first embodiment of the present invention.
Figure 4B:
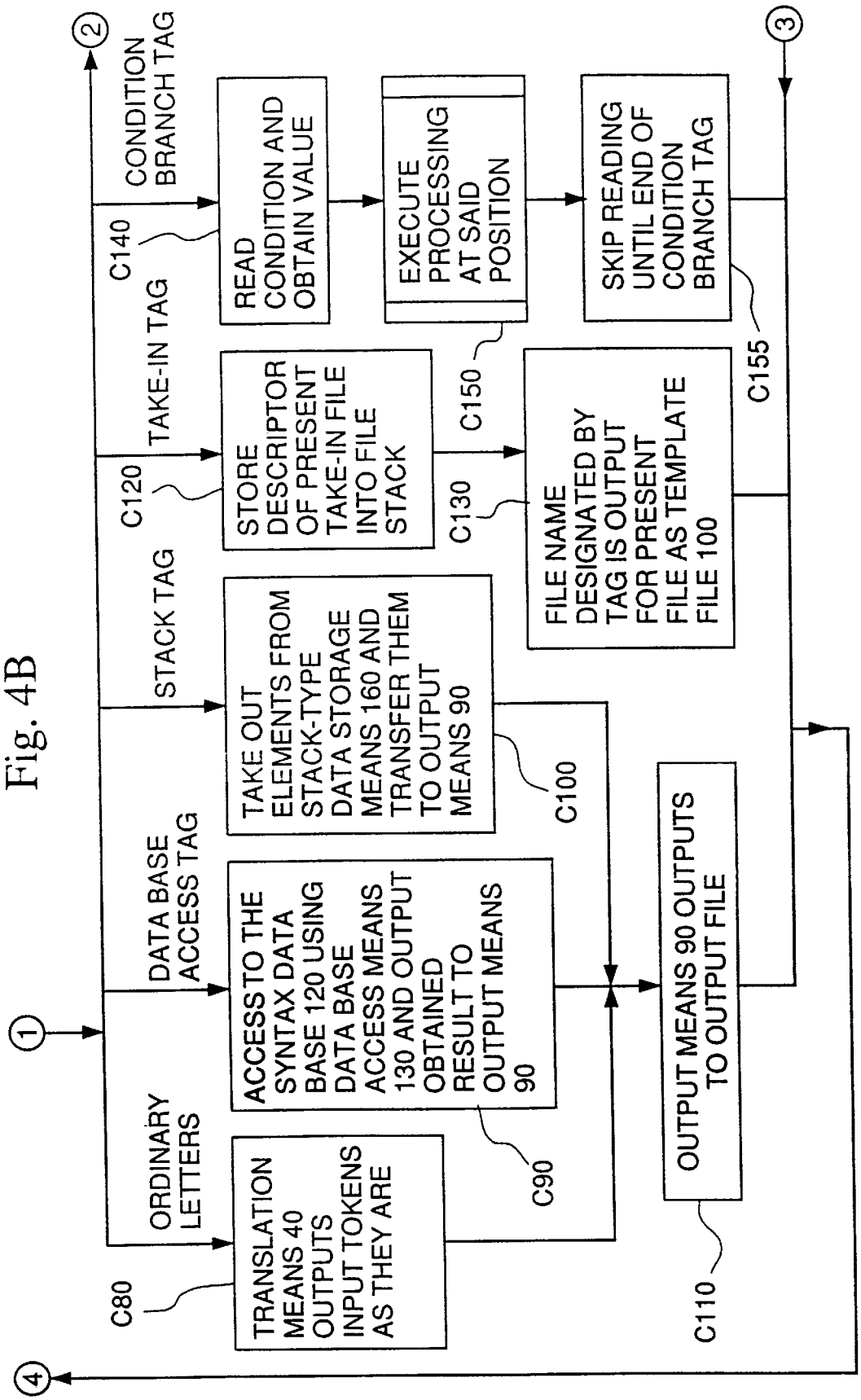
Figure 4C:
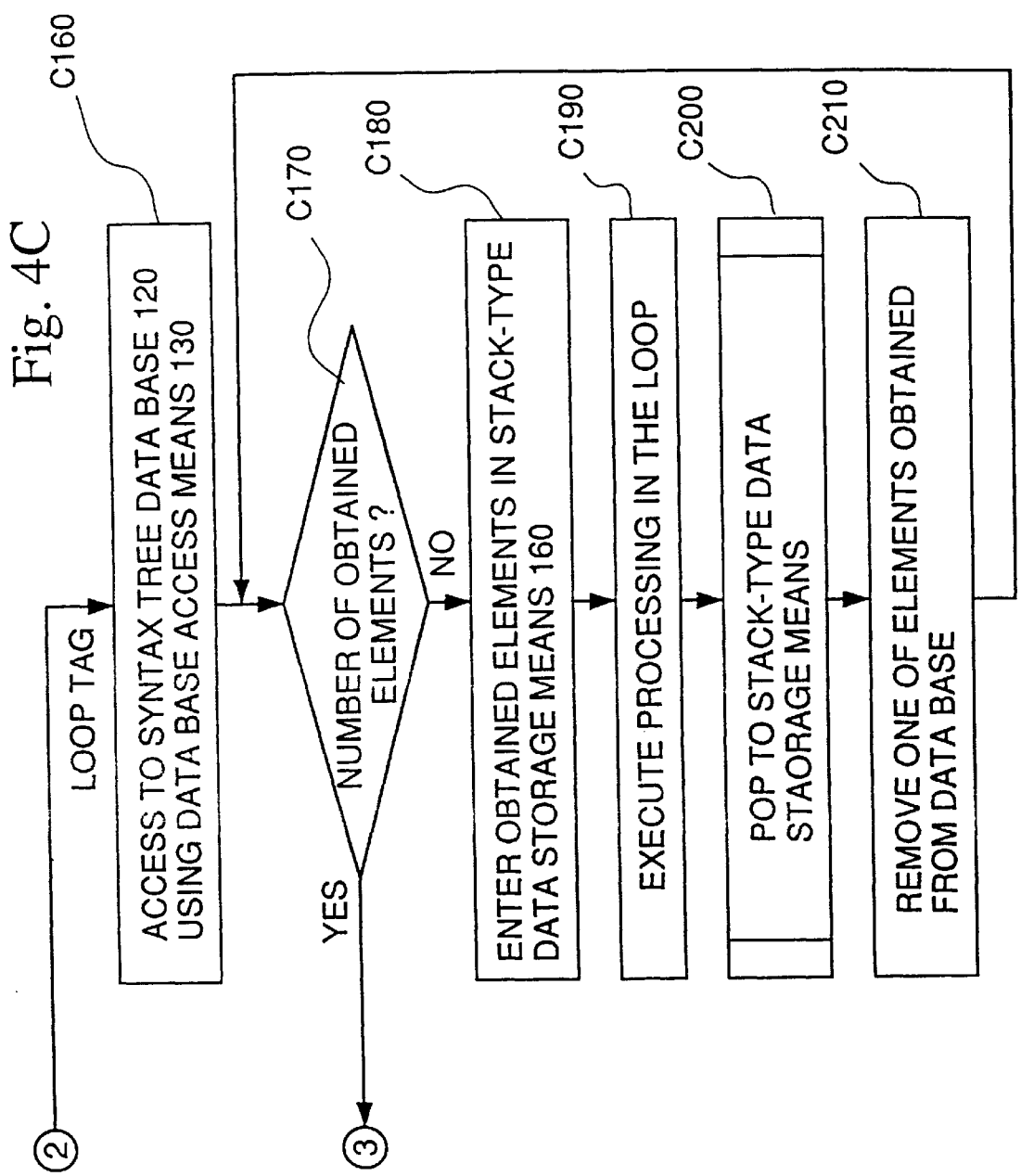

FIG. 4 is a flow-chart showing an operation of the code generator 150. The syntax reading means 60 reads the output template file 100 in the code generator (Step C10). The lexical analysis means 70 divides the content of the output template file 100 into respective tokens and transfers those tokens to the translation means 80 (Step C20). The translation means 80, first, checks whether or not the end token representing the end of the file is transferred (step C30). If it is the last token, a check is further executed to determine whether or not the file stack 170 is empty (Step C60). If the file stack is empty, the processing of the code generator is completed. If the file stack is not empty, the code generator 150 takes out of the file stack 170 a descriptor located at the uppermost position, and the processing is restarted from the reading Step C10 from the position indicated by the file descriptor, using a file indicated by the descriptor as the output template. If the token is not the last one representing the end of the file, the translation means 80 then classifies the content of the token and executes processing conformable to the classification (Step C50).

If the content of the token is ordinary letters, the translation means 80 outputs these letter to the output means as they are (Step C80).

If the token contains a 'data base access tag', the translation means 80 then accesses to the syntax tree data base 120 through the data base access means 130 to obtain a value, which is transferred to the output means 90 (Step C90).

If the token is a 'stack tag', the next token is then obtained. The next token is a token designating the position in the stack. The translator 80 picks out of the stack-type data storage means a value at the designated position through the stack-type data access means 160. The translation means transfers the obtained value to the output means 90 (Step C100).

In any of those cases such as C80, C90, and C100, after the processing, the output means 90 outputs each value to the end of the output file 110 (Step C110).

If the token is an 'include tag', the next token is further obtained. The next token is a name of the other output template file. The translation means 80 first stores a file descriptor indicating the present template file 100 into the file stack through the file stack access means 160 (Step C120). The file descriptor indicates the file uniquely and the present reading position. The file designated by the token is then opened, and the file descriptor is obtained. The present output template is replaced with a new output template prepared by using the obtained file descriptor and the process returns to the step C10 to continue processing.

If the tag is a 'conditional branch tag', then a conditional portion designated by the conditional branch tag is read, and the value is obtained (Step C140). The translator then jumps to the output template file 100 until a condition tag having the same value as the obtained value. The condition tag designates the value and a specific region in the output template file. The translation means 80 transforms the region owned by the condition tag with the same value to the processing routine of the code generator to be proessed by corresponding steps from C10 to C210. When the processing of the region is completed, the processing returns to the step C10 by jumping until the end of the conditional branch tag.

If the token is a 'loop tag', a data base access pattern designated by the loop tag is obtained. The translation means 80 searches a set of values designated by the data base access pattern from the syntax tree data base 120 through the data base access means 130. In this retrieving operation, the obtainable value is from 0 to a limited number. The retrieving means 80 examines whether or not the obtained value is zero or not (Step C170). If the number is zero, the means jumps to the end of the loop tag and continues processing from the step C10. Otherwise, the retrieving means 80 stores one of the obtained values in the stack-type data storage means 160 by the use of the stack-type data access means 190. In this state, the region designated by the loop tag is transferred to the processing routine of the code generator and processing is executed corresponding to steps from C10 to C210. When the step C190 is completed, the previously stored value is deleted (Step C200). At the same time, the value is removed from the values obtained previously (C210). The processing continues from the step C170 after jumping to read the template file 100 to the top position of the loop tag.

A more detailed description will be given hereinafter on the operation of this embodiment referring to a practical example.

FIG. 5 illustrates an example of the output template file 100 of the present invention. A portion surrounded by '<' and '>' is a tag, and the other portions are ordinary tokens. There are two types of tags with the same name; one is a set of tags such as '<FOR>', and the other is a set of tags such as '</FOR>' containing '/'. These tag sets bound in a set represent a region in the output template. The region is constructed with a nest containing structures.

Here, an example of an operation of the code generator is described referring to the output template shown in FIG. 5. The file name of the output template file is named 'test. gen'. First, the syntax reading means 60 reads the output template 100 (Step C10). The lexical analysis means 30 divides the output template into tokens to obtain an 'INCLUDE tags'. The lexical analysis means 30 judges whether or not the tag is the include tag to obtain the file name.

'@($CONFIGFILEDIR, "/", "heading_acgen. gen")>' represents the file name, which is represented by connecting a value of an environmental variable 'CONFIGFILEDIR', with a letter string of '/', and a letter string of 'heading_acgen. gen'. Assume the letter string is represented, for example, '/home/heading_ acgen. gen'. The translation means 80 stores a file descriptor of the file "test. gen" in the file stack 170 (Step C120). The file '/home/heading acgen/.gen' is then opened, which is replaced as a new template file. The operation returns to the step C10 to continue the processing.

Next, the lexical analysis means 70 obtains a loop tag (a FOR tag) (Step C20). The translation means 80 acquires an access pattern of the data base of the loop tag. In the case, the pattern is 'CLASSES'. Assume that only two patterns such as 'log' and 'eventFordingDiscriminator' agree with the access pattern. The translator 80 first pushes the "log" into the stack-type storage means 160 (Step C180). The 'log' is stored at the 0-th position of the stack-type data storing means 160. Next, assuming that a region surrounded by '<FOR>' and '</FOR>' is a virtual output template, a recursive call for processing by the code generator 150 is conducted (Step C190).

Here, a processing by the recursive call for a region of '<FOR "CLASSES">' and '</FOR' is described. The lexical analysis means 70 calls a token and obtain the next token '<FOR ¥0"ACTION">'. In this access pattern, '¥0' indicates an element 'log' located at the 0-th position in the stack-type data storage means 160. Namely, the access pattern here is '"log" "ACTIONS"'. Assume that only one value of 'stateChange' is obtained provisionally. The translation means 140 pushes the 'stateChange' into the stack-type storage means (Step C180). Here, an element located at the 0-th position and the first position of the stack-type data storage means are 'stateChange' and 'log', respectively. The region surrounded by '<FOR ¥0 "ACTIONS"' and '</FOR>' is set as a virtual output template, the recursive call for processing by the code generator is conducted (Step C190).

Next, an example of the processing conducted by the recursive call is explained. The lexical analysis means obtains a letter string of 'Attr*GEM'. the translation means 80 separates the letter string from the ordinary tokens (Step C50), and describes the 'Attr*GCM' additionally to the end of the output file 110 (Step C80).

The translation means 80 then obtains a stack token '<STACK 1>'. The translation means 80 obtains the element 'log' located at the first position in the stack-type data storage means 160 and output the first element to the output file 110.

While executing similar processing, the translation means 80 obtains '<IF (¥0, "TYPE")>'. The access pattern now changes to '("stateChange", "TYPE")>'. Here, the obtained value is provisionally named 'shared' (Step C140). The translation means 80 searches for a value which has the value of 'shared' among conditional tags (MATCH tags). If the value is found, the processing by the code generator is activated for the recursive call processing for a region surrounded by '<MATCH "Shared">' and '</MATCH>', and the processing is conducted (Step C150). When the processing is completed, a jump is conducted to '</IF>which corresponds to the end position of the conditional branch tag, and the processing continues from the step C10.

When the processing is completed until '</FOR>' corresponding to '<FOR ¥0 "ACTIONS">', the stack-type data storage means 160 is poped and the element located at the 0-th position, 'stateCharge', is abandoned (Step C200); whereby the element located at the 0-th position in the stack-type element is replaced again with 'log'. The 'state Change' is removed from a set of values obtained by '<FOR ¥0 "ACTIONS">' (Step C210).

The translation means 80 confirms the number of elements in a set of values (Step C170). Since the number of elements obtained by '<FOR ¥ "ACTIONS">' is zero, a jump is directed to a position '</FOR>' and to continue the processing from the step C10.

By repeating those processes, the output file shown in FIG. 6 is produced.

The other embodiments

Hereinafter, a second embodiment of the present invention will be described hereinafter.

Figure 7:
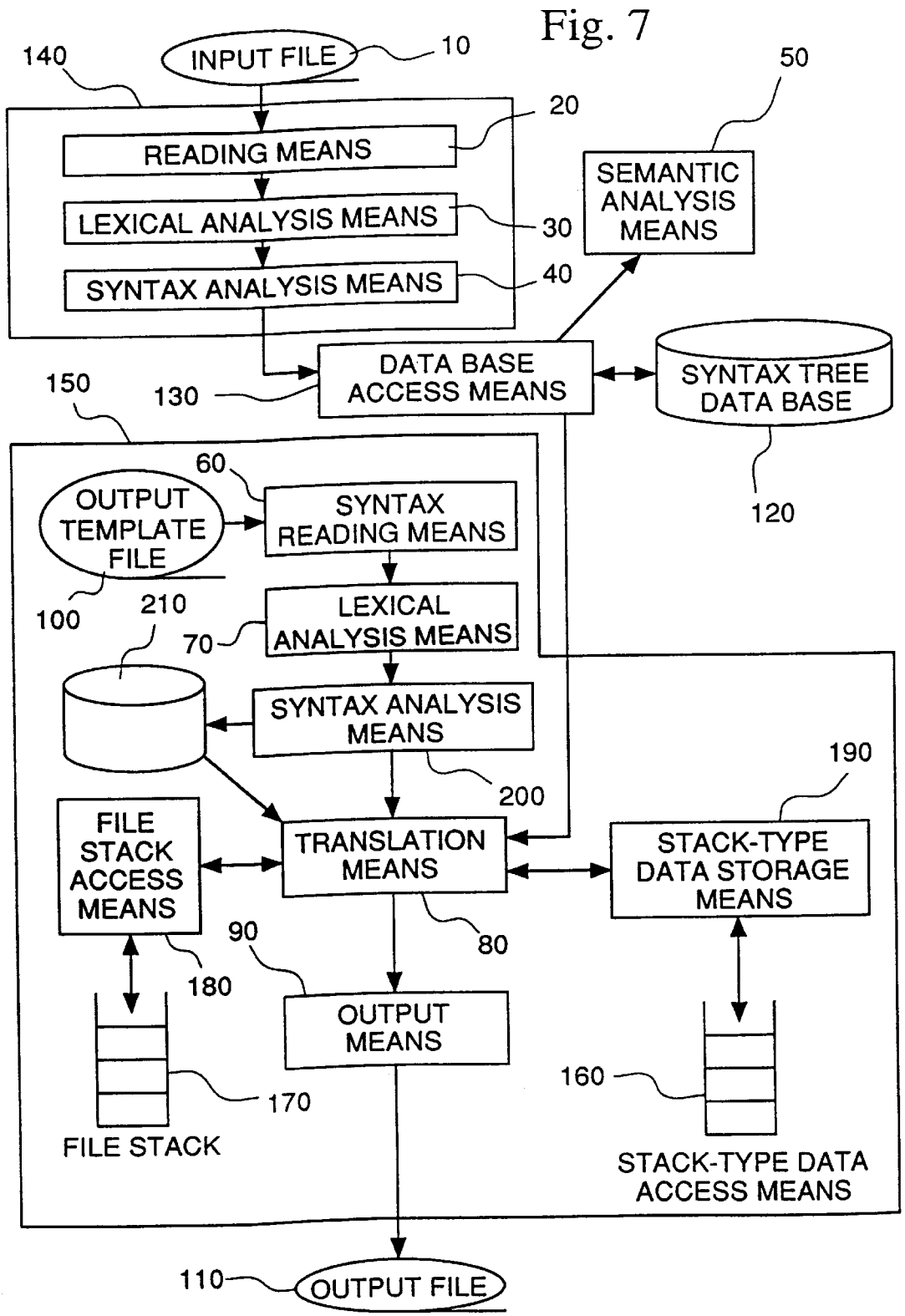
FIG. 7 is a block diagram showing a construction of the second embodiment of the present invention.

Referring to FIG. 7 which illustrates a construction of the second embodiment, the second embodiment differs from the first embodiment shown in FIG. 1 in that the code generator 150 of the second embodiment includes a syntax analysis means 200 and a syntax data base 210. The syntax analysis means 200 conducts a syntax analysis for tokens received from the lexical analysis means 70 and stores an abstract syntax tree of the output template file 100 in the syntax data base 210. The translation means 80 does not receive tokens from the lexical analysis means 70. However, the translation means 80 obtains a content of an output template 100 from the syntax data base 210 and generates the content of the output file 110 according to the thus obtained output template content.

An operation of this embodiment is described hereinafter referring to drawings.

Figure 8A:
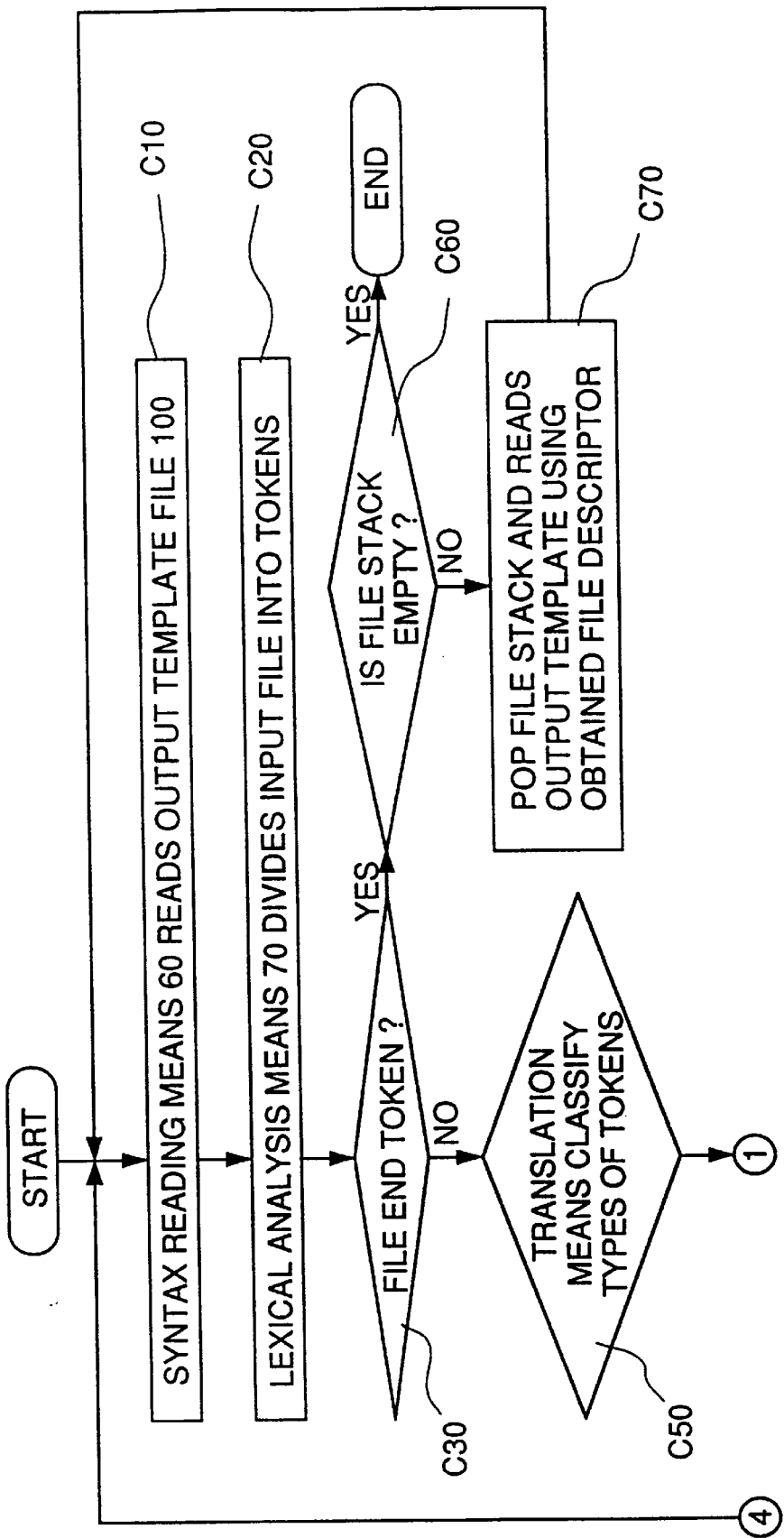
Figure 8B:
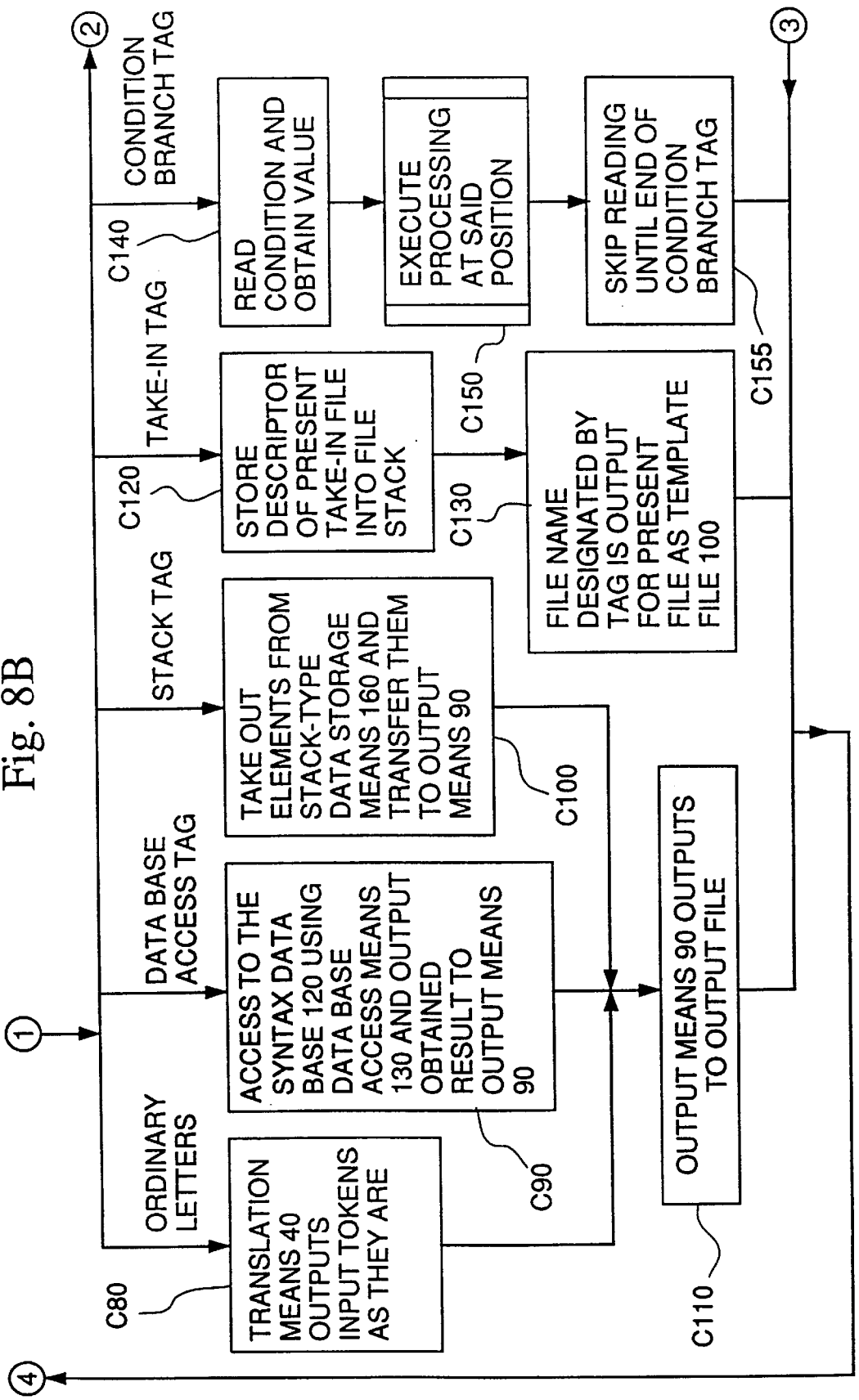

A flow-chart showing the operation of the present embodiment is illustrated in FIG. 8. Operations of the code generator of the present embodiment represented by steps C10 to C20 and C30 to C210 in FIG. 8 are the same as those of the first embodiment shown by steps C10 to C20 and C30 to C210, so that the description of those operations are omitted. The operations of the parser of the first embodiment shown in FIG. 3 are the same as those of the present embodiment, so that the description will be also omitted. In this embodiment, only operations which differ from the first embodiment will be described.

In the first embodiment, the translation means read each token possessed by the output template through the syntax reading means 60 and the lexical analysis means 70. Furthermore, in the first embodiment, if the loop tags are present, the translation means 80 is to read the region of the loop tag for times corresponding to the loop cycles. In contrast, in the second embodiment, tokens divided by the lexical analysis means 70 are translated by subjecting to the syntax analysis by the syntax analysis means 200 and an abstract syntax tree of the output template is produced to be stored in the syntax data base 210 (Step C25). This processing is repeatedly executed until the end token of the file appears (Step C28). When the end token of the file appears, a code is generated by the translation means 80. Practically, the translation means 80 obtains the token from the syntax data base 210 (Step C28). Subsequently, the same operation as that of the first embodiment is executed. When each step of C110, C130, C155, C170 and C210 is reached, the operation is restarted after returning to the step C29.

Figure 9:
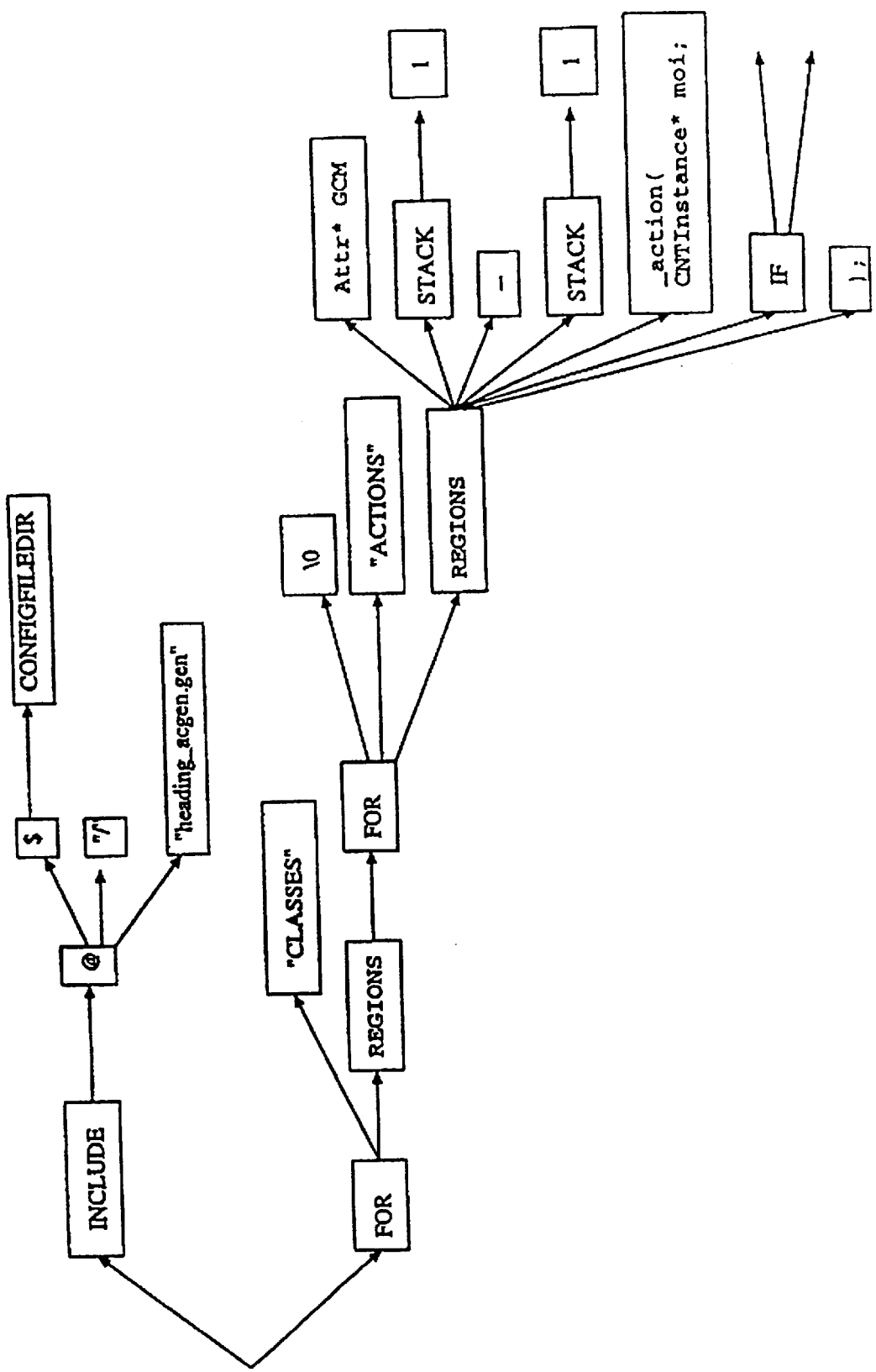
FIG. 9 shows an example of abstract syntax trees representing the content of the output template files.
Figure 10:
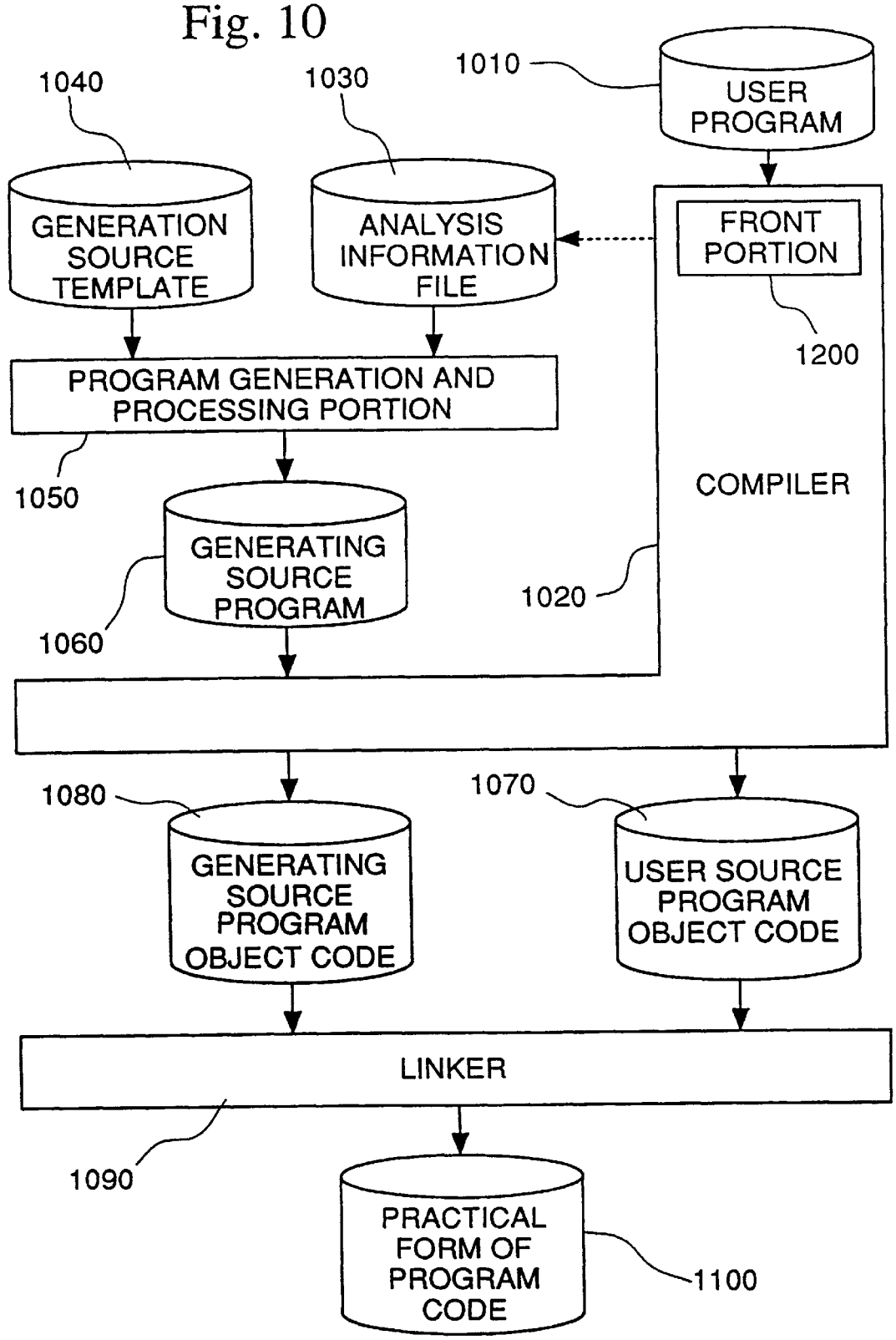
FIG. 10 is a block diagram showing a construction of a background art.

Practical operations will be described. The output template file shown in FIG. 5 is taken as an example. The syntax reading means 60 first reads the output file 100. The lexical analysis means 70 cuts and divides the read template file into tokens successively and transfers these tokens to the syntax analysis means 200. At this time, the lexical analysis means divides the template into tokens composed of '<', 'INCLUDE', '@', '(', '$', and 'CONFIGFILEDIR'. The syntax analysis means 200 produces an abstract syntax tree 200 shown in FIG. 9 from those tokens, and stores them in the syntax data base 210. This processing is repeated until the end of the file.

Subsequently, the syntax analysis means 80 accesses token by token to the syntax tree obtained by the above step from the syntax data base 210.

In this embodiment, a processing speed can be made higher, even if such tags as the loop tag are present in the output template file 100, because the reading operation can be completed in one time. In addition, all of the errors in the syntaxes can be found in the step C25 in the steps of producing the syntax tree. In the first embodiment, in contrast, errors of the syntaxes of the output template 100 are found by the translation means at the step C50. Syntax errors may not be found in a portion of the output template which is not subjected incidentally to the processing.

In order to realize the GDMO translator of the present invention by use of a computer, a computer-interpretable program containing functions of the GDMO translator is first produced, the program is stored in recording mediums such as a CD-ROM and a floppy disc, and the thus produced program is installed in the computer to execute functions of the present invention.

Many advantageous effects are obtained by the present invention.

The first effect is that the present invention makes it easy to construct a GDMO translator having various output file syntaxes. This effect arises for the following reasons. That is, since the translation means of the present invention generates an output file from the input file according to the output template file, the syntax of the output file can be easily changed by changing the content of the output template file.

The second effect of the present invention is that it is possible to generate an output file in conformity with a complicated syntax.

The reason for the second effect is that the output file of the present invention comprises various tags such as a reading tag (INCLUDE tag) which allows a recursive representation, a conditional branch tag (IF tag), which allows changing the output by the input, and a loop tag (FOR tag) which allows a repetitive representation; and the translation means comprises a file stack or a stack-type data storage means as structures for executing those tags.

The third effect is that the present invention allows high speed translation of the output template file, even if loop tags are included. The reason for the above effect is that the syntax analysis means reads the output template before generating the output file, produces the abstract syntax tree in advance, and stores the abstract syntax tree in the syntax data base.

What is claimed is:

1. A Guidelines for the Definition of Managed Objects (GDMO) translator for producing an output file from an input file in which a GDMO template is described, comprising:

a parser for producing an abstract syntax tree by reading said input file and by conducting syntax analysis;

a syntax tree data base for storing the abstract syntax tree produced by said parser; and a template code generator comprising.

an output template file for regulating a syntax of said output file:

a lexical analysis means for dividing the content of said output template file into respective tokens and transferring the tokens to a translation means; and a translation means for generating an output file by reading the tokens and by accessing the abstract syntax tree stored in said abstract syntax data base based on said output template file obtained by the reading process.

2. The GDMO translator according to claim 1, wherein said code generator further comprises a file stack for recording a file descriptor of a take-in file, in order for said translation means to process an include tag in said output template file.

3. The GDMO translator according to claim 1, wherein said code generator further comprises a stack-type data storage means for temporarily storing a loop tag during processing and some values at halfways of processing, in order for said translation means to process said loop tag in said output template.

4. The GDMO translator according to claim 1, further comprising:

a syntax analysis means for producing a second abstract syntax tree by executing a syntax analysis of the content of said output template file; and a syntax data base for storing the second abstract syntax tree generated by said syntax analysis means;

wherein said translation means generates said output file by obtaining the abstract syntax tree of said output template file from said syntax data base.

5. A method of Guidelines for the Definition of Managed Objects (GDMO) translation for generating an output file from an input file containing a description of the GDMO template comprising the steps of:

generating an abstract syntax tree by reading the input file and by using a parser to perform a syntax analysis;

storing the abstract syntax tree produced by the parser in a syntax tree data base; and generating an output file by:

reading an output template file for regulating the syntax of said output file, wherein the content of the output template file is divided into respective tokens; and accessing a syntax tree stored in the syntax tree data base depending upon the content obtained by said reading step.

6. A method of Guidelines for the Definition of Managed Objects (GDMO) translation for generating an output file from an input file containing a description of a GDMO template, comprising the steps of:

generating an abstract syntax tree by reading the input file and by using a parser to perform a syntax analysis;

storing the abstract syntax tree produced by the parser in a syntax tree data base;

producing a second abstract syntax tree by performing a syntax analysis for an output template file which regulates a syntax of the output file;

storing the second syntax tree in the syntax data base; and generating an output file by reading the second abstract syntax tree from the syntax data base and by accessing the abstract syntax tree stored in the syntax tree data base depending upon the content obtained by the reading process.

7. The method of GDMO translation according to claim 5, wherein, when a data base access tag is described in said output template, an output file produced reflecting a value obtained by accessing the syntax data base.

8. A method of GDMO translation according to claim 5, wherein, when a loop tag is present in said output template file, the method comprises the steps of:

retrieving a plurality of values by accessing said syntax tree, pushing these retrieved values one by one to the stack-type data storage means, translating a region surrounded by the repeating tags and, after the translation, popping the previous values from said stack-type data storage means; and implementing the process of pushing the previous value repeatedly at the same number of times as the number of retrieved values.

9. The method of GDMO translation according to claim 5, wherein, when a stack tag is present in said output template file, the output file is produced reflecting the value obtained by taking out elements designated by the stack tag.

10. The method of GDMO translation according to claim 5, wherein, when a conditional branch tag is present in said output template file, the method comprising the steps of:

reading said conditional branch tag;

obtaining values of a condition portion;

retrieving condition tags having the same values as the obtained values from said output template file;

executing processing for a region surrounded by said condition tags.

11. A method of GDMO translation comprising the steps of:

storing a present file descriptor in a file stack, when a take-in tag is present in said output template file;

setting the file designated by the take-in tag as a new output template file;

popping said file stack, when the new take in tag is completed;

restarting generation of the output file using the previous output template file just behind said reading tag, by the use of the file descriptor stored in said file stack.

12. The method of GDMO translation according to claim 5, wherein, when a letter string, which is not a tag, is present in said output template file, the letter string is output into the output file as it is.

13. A computer readable recording medium containing a program for GDMO translator for generating an output file based on an input file including a description of GDMO template comprising:

a parser function for producing an abstract syntax tree by reading said input file and by conducting syntax analysis of said input file; a syntax tree data base function for storing the abstract syntax tree produced by said parser function in a memory means in the computer;

a template code generator comprising:

an output template file which regulates the syntax of said output file;

a lexical analyzer for dividing the content of the output template file into respective tokens and transferring the tokens to a translation function: and a translation function for reading the tokens and for generating an output file by accessing the abstract syntax tree stored in said syntax tree data base from the content obtained by reading.

14. The computer readable recording medium containing a program for GDMO translator, wherein a code generator function comprising:

a syntax analysis means for conducting a syntax analysis of said output template file content to produce a second abstract syntax tree; and a data base function to make a memory means in the computer store the second abstract syntax tree produced by said syntax analysis function;

wherein, said translation means generates said output file by obtaining said second abstract syntax tree.

15. A method of Guidelines for the Definition of Managed Objects (GDMO) translation for generating an output file from an input file containing a description of the GDMO template comprising the steps of:

generating an abstract syntax tree by reading the input file and by using a parser to perform a syntax analysis on the abstract syntax tree;

storing the abstract syntax tree produced by the parser in a syntax tree data base; and generating an output file by:

reading an output template file for regulating the syntax of said output file and accessing a syntax tree stored in the syntax tree data base depending upon the content obtained by said reading step, wherein when a loop tag is present in the output template file, the method further comprises the steps of:

retrieving a plurality of values by accessing said syntax tree, pushing these retrieved values one by one to the stack-type data storage means, translating a region surrounded by the repeating tags and, after the translation, popping the previous values from said stack-type data storage means; and implementing the process of pushing the previous value repeatedly at the same number of times as the number of retrieved values.

16. A method of Guidelines for the Definition of Managed Objects (GDMO) translation for generating an output file from an input file containing a description of the GDMO template comprising the steps of:

generating an abstract syntax tree by reading the input file and by using a parser to perform a syntax analysis on the abstract syntax tree;

storing the abstract syntax tree produced by the parser in a syntax tree data base; and generating an output file by:

reading the output template file for regulating the syntax of said output file and accessing a syntax tree stored in the syntax tree data base depending upon the content obtained by the reading process, wherein when a conditional branch tag is present in said output template file, the method comprising the steps of:

reading the conditional branch tag;

obtaining values of a condition portion;

retrieving condition tags having the same values as the obtained values from said output template file;

executing processing for a region surrounded by said condition tags.

17. A method of Guidelines for the Definition of Managed Objects (GDMO) translation for generating an output file from an input file containing a description of the GDMO template comprising the steps of:

generating an abstract syntax tree by reading the input file and by using a parser to perform a syntax analysis on the abstract syntax tree;

storing the abstract syntax tree produced by the parser in a syntax tree data base; and generating an output file by:

reading the output template file for regulating the syntax of said output file and accessing a syntax tree stored in the syntax tree data base depending upon the content obtained by the reading process, wherein when a letter string, which is not a tag, is present in said output template file, the letter string is output into the output file as it is.

* * * * *